(12) United States Patent
Nishikawa et al.

(10) Patent No.: US 7,542,216 B2
(45) Date of Patent: Jun. 2, 2009

(54) ZOOM LENS SYSTEM

(75) Inventors: Katsuhiko Nishikawa, Saitama (JP);
Noriyuki Nakazawa, Saitama (JP)

(73) Assignee: Tamron Co., Ltd., Saitama-shi, Saitama (JP)

( * ) Notice: Subject to any disclaimer, the term of this patent is extended or adjusted under 35 U.S.C. 154(b) by 0 days.

(21) Appl. No.: 12/222,702

(22) Filed: Aug. 14, 2008

(65) Prior Publication Data
US 2009/0073576 A1    Mar. 19, 2009

(30) Foreign Application Priority Data
Sep. 14, 2007    (JP)    ............................. 2007-239436

(51) Int. Cl.
*G02B 15/14*    (2006.01)

(52) U.S. Cl. ...................... 359/700; 359/701; 396/72

(58) Field of Classification Search ......... 359/694–704; 396/72, 79, 341, 344, 349, 436, 462, 535; 348/360
See application file for complete search history.

(56) References Cited

U.S. PATENT DOCUMENTS

| | | | | |
|---|---|---|---|---|
| 5,034,762 A | * | 7/1991 | Kohmoto | ..................... 396/72 |
| 5,313,329 A | * | 5/1994 | Ueda | .......................... 359/676 |
| 5,950,019 A | * | 9/1999 | Azegami et al. | ............... 396/72 |
| 6,788,475 B2 | * | 9/2004 | Nomura et al. | ............. 359/700 |
| 6,819,502 B2 | * | 11/2004 | Nomura et al. | ............. 359/701 |
| 7,088,524 B2 | * | 8/2006 | Nomura et al. | ............. 359/700 |

\* cited by examiner

*Primary Examiner*—Loha Ben
(74) *Attorney, Agent, or Firm*—Jacobson Holman PLLC

(57) ABSTRACT

The present invention is directed to improve prior art zoom lens systems that have groups of lens pieces moved within a lens barrel for the zooming and the focusing and to provide an improved zoom lens system that is simplified and robust in configuration so as to withstand malfunctions well and is capable of effectively and assuredly eliminating stray light. The zoom lens system comprises a first cam barrel rotating about the optical axis and a second cam barrel located inside the first cam barrel in cam-linkage with the same, and the zoom lens system is characterized in that the second cam barrel has openings to let light beams pass through, and that a light-shielding plate like an iris diaphragm is supported by the second cam barrel in position closer to the photographed subject in the second cam barrel so as to shield the light beams that come in from the openings in the second cam barrel after going out of the openings in the second cam barrel and then being reflected from an inner surface of the first cam barrel.

4 Claims, 3 Drawing Sheets

ZOOM LENS SYSTEM

FIELD OF THE INVENTION

The present invention relates to a zoom lens system, and more particularly, to a zoom lens system that is capable of eliminating adverse beams to the imaging which is caused by stray light, namely, a factor other than the normal refraction and/or reflection of beams, so as to produce a vivid image.

BACKGROUND ART

In order to prevent stray light from reaching an image plane and/or to make jumbled inner part of a lens barrel unseen from the outside, a light-shielding plate like an iris diaphragm is fixedly arranged inside the lens barrel.

Another embodiment of the stray light eliminating arrangement has been disclosed, which is a lens barrel that comprises a first lens frame member moving along the optical axis, a second lens frame member relatively moving closer to and apart from the first lens frame member, and a light-shielding member capable of blocking beams between the first and second lens frame members from leaking, the light-shielding member being sufficiently elastic to be transformed to have a segment of an inflection curve along the optical axis as the first and second lens frame members come close to each other (see Patent Document 1 listed below).

Still another embodiment of the stray light eliminating arrangement has also been disclosed, which is a lens barrel that comprises first and second groups of lens pieces relatively varied in an interval therebetween along the optical axis and that also comprises a light-shielding device held by the first group of lens pieces and/or the second group of lens pieces and consisting of a plurality of approximately cylindrical light-shielding members. Each of the light-shielding members partially overlaps an adjacent one in series along the optical axis, and an amount of the overlap of the adjacent ones of the light-shielding members is varied depending upon the interval between the groups of lens pieces, so as to permit the light-shielding device to telescopically expand and shrink (see Patent Document 2 listed below).

A zoom lens barrel using plastic cams has those cams collectively arranged in a single cam barrel member as much as possible in order to attain a control of movements of the groups of lens pieces. Specifically, the single plastic cam barrel is provided with convex cams, cam grooves, tapered cams, and the like. In order to avoid a light but sharp feeling of shock that the cam barrel makes while it is being revolved for the zooming or the like, cam barrel components located within a range of a stroke from a wide-angle view to a telephoto view are to be molded without seam or parting line that is likely to be caused along a junction of dies.

With the convex cams employed in the cam barrel, its surface areas with the cams are radially raised by one step from those without cams. If the convex cams extend along the fully encircling surface of the cam barrel, light cannot find a clearance to slip in or out between distinct convexities radially raised from the cam barrel, resulting in the stray light being avoided.

Actually, however, the convex cams can not be provided along the full girth of the cam barrel because the seam, namely, the parting line resulted from the junction of the dies should not exist in the surface areas with the convex cams for the purpose of the completely smooth stroke of the cam barrel as mentioned above. Thus, there is a clearance partially between the surface areas provided with the convex cams in the cam barrel and another barrel component provided with sliding studs that are engaged with the convex cams. Light beams, after passing through the clearance, are directly directed to an imaging plane of film or CCD, or first reflected from an inner surface of the lens barrel and then directed to the imaging plane of the same, causing the resultant image to be deteriorated in vividness.

In addition, when the opposite lateral walls defining each cam groove are not parallel to each other, with their respective outward portions spreading more apart from each other to have a trapezoidal vertical cross-section of the cam groove, the sliding studs have to be forced against the bottom of the cam grooves by using some pushing means such as a coil spring. To employ this means, it is inevitable to have the sliding studs greater in diameter and accordingly have the cam grooves larger in width, and as a consequence, the stray light is more prone to occur.

The lens barrel as disclosed in Patent Document 1 works effectively only if it has a configuration where the a distance between first and second groups of lens pieces is varied only slightly as a result of the stroke of the zoom lens from the telephoto view to the wide-angle view or vice versa. In order to permit the distance between the first and second groups of lens pieces to be varied more greatly, the elastic light-shielding member must be greater in dimensions, which makes the process of attaching the light-shielding member laborious and unstable. Additionally, the elastic light-shielding member is transformed more as a result of the stroke of the zoom lens, and the elastic light-shielding member transformed to a greater extent is likely to lose its ability to shield light as it can under normal conditions.

The lens barrel as disclosed in Patent Document 2 has a disadvantage that the plurality of the conical and approximately cylindrical members, as a result of having any adjacent couple of them partially overlapped with each other to serve as the light-shielding device, require the lens barrel increased in diameter to house them. Since the combined conical cylindrical members have their collective extension along the optical axis restricted to the minimum of the distance between the first and second groups of lens pieces and are limited in number depending upon the maximum of the distance, the lens barrel is more likely to have a greater diameter when the distance between the first and second groups of lens pieces is varied more as a result of the stroke of the zoom lens.

<List of Patent Documents>
Patent Document 1:
  Japanese Patent Publication of Unexamined Application No. H11-84198
Patent Document 2:
  Japanese Patent Publication of Unexamined Application No. 2003-66315

Accordingly, it is an object of the present invention to improve the prior art lens systems, especially, the prior art zoom lens systems where groups of lens pieces move within a lens barrel for the zooming and the focusing and to provide an improved zoom lens system that is simplified and robust in configuration so as to withstand malfunctions well and that is capable of effectively and assuredly eliminating stray light.

A zoom lens system according to the present invention comprises a first cam barrel rotating about the optical axis and a second cam barrel located inside the first cam barrel in cam-linkage with the same, and the zoom lens system is characterized in that the second cam barrel has openings to let light beams pass through, and that a light-shielding plate like an iris diaphragm is supported by the second cam barrel in position closer to the photographed subject in the second cam barrel so as to shield the light beams that come in from the openings in the second cam barrel after going out of the openings in the second cam barrel and then being reflected from an inner surface of the first cam barrel.

In an aspect of the present invention, the openings in the second cam barrel are clearances defined to avoid an interference of the second cam barrel with a driving member used to move components within the second cam barrel.

Convex cams are provided in an inner surface of the first cam barrel or an outer surface of the second cam barrel, and the light beams that are to be reflected from the inner surface of the first cam barrel pass through portions where the convex cams are terminated.

A zoom lens system, which has groups of lens pieces moved within a lens barrel for the zooming and the focusing according to the present invention, is simplified and robust in configuration so as to withstand malfunctions well and is capable of effectively and assuredly eliminating stray light.

BEST MODE OF THE INVENTION

Preferred embodiments of a zoom lens system according to the present invention will now be described with reference to the accompanying drawings.

Embodiment 1

Figure 1:
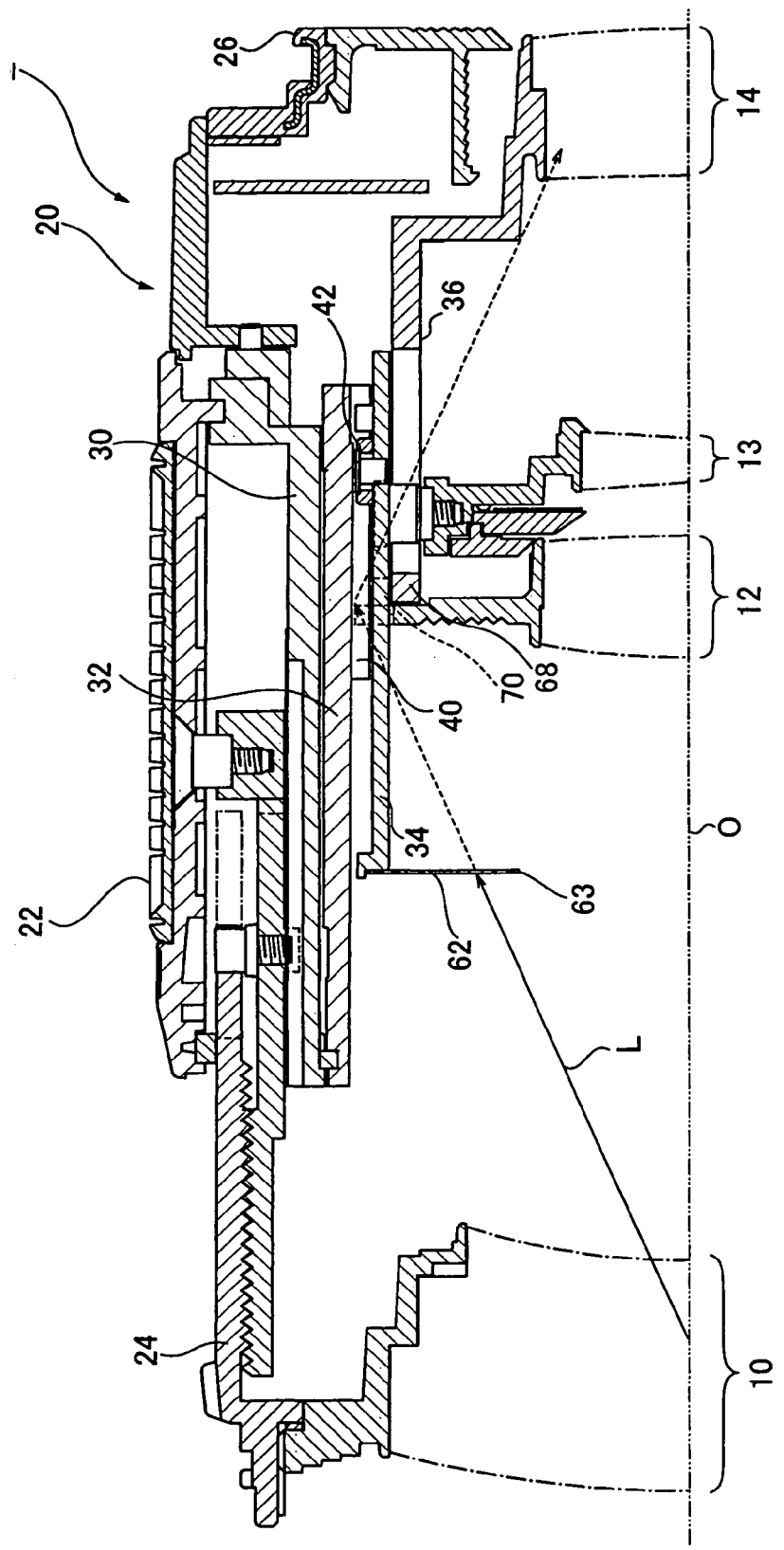
FIG. 1 is a sectional view illustrating a first embodiment of a zoom lens system according to the present invention set in a shooting position for a wide-angle view.
Figure 2:
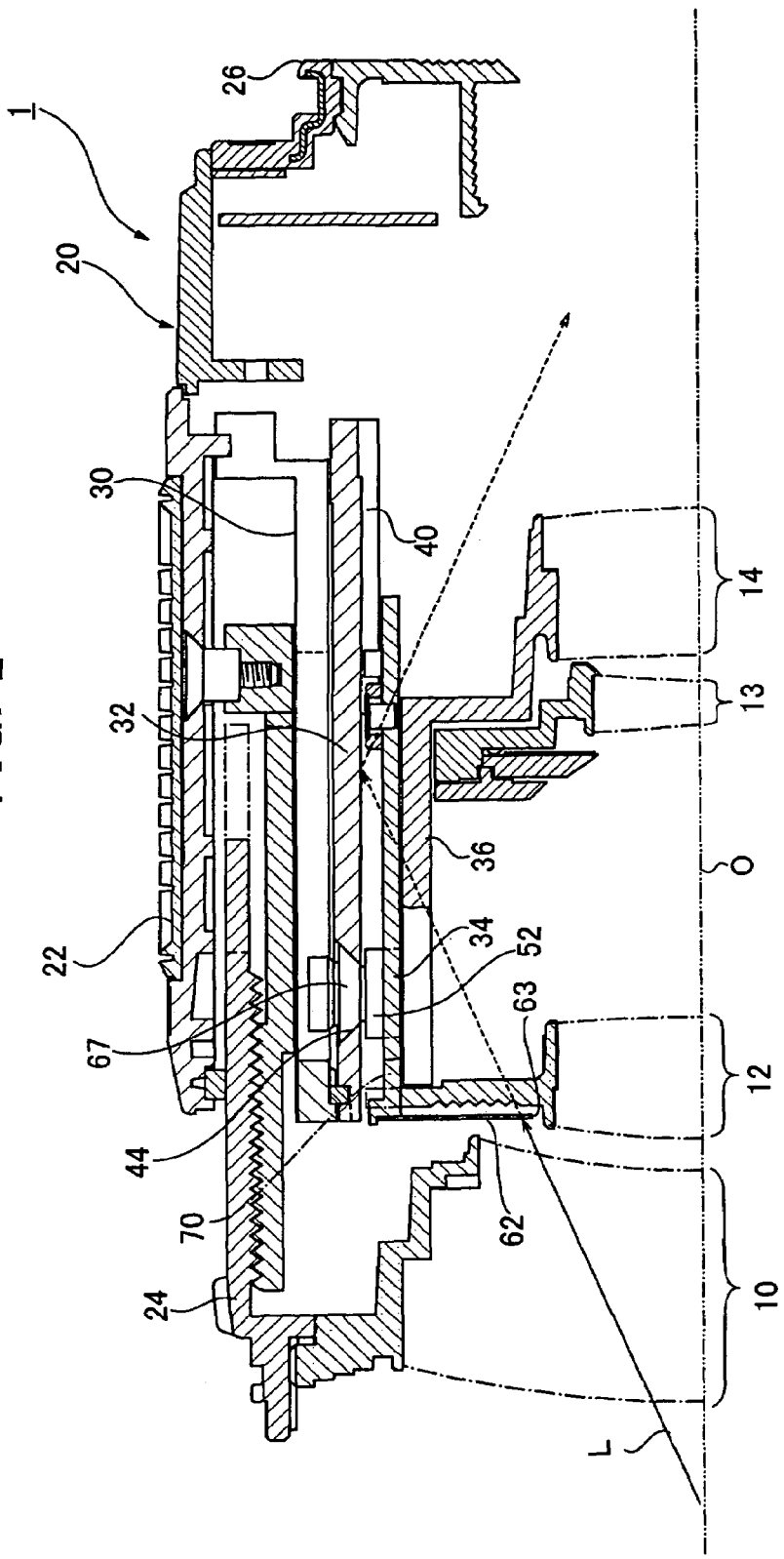
FIG. 2 is a sectional view illustrating the first embodiment of the zoom lens system according to the present invention set in a shooting position for a telephoto view.

As shown in FIGS. 1 and 2, a zoom lens system 1 comprises a first group of lens pieces 10, a second group of lens pieces 12, a third group of lens pieces 13, and a fourth group of lens pieces 14. A lens barrel 20 is comprised of a zooming ring 22, a focusing ring 24, and a mount 26 for coupling the lens barrel 20 to a camera body (not shown). The lens barrel 20 further has a first cam barrel 32 located inside a fixed barrel 30 and connected to the zooming ring 22 for revolving about the optical axis, a second cam barrel 34 located inside the first cam barrel 32 for sliding along the optical axis without revolving, and a linear cam barrel 36 located inside the second cam barrel 34 for sliding along the optical axis without revolving.

Figure 3:
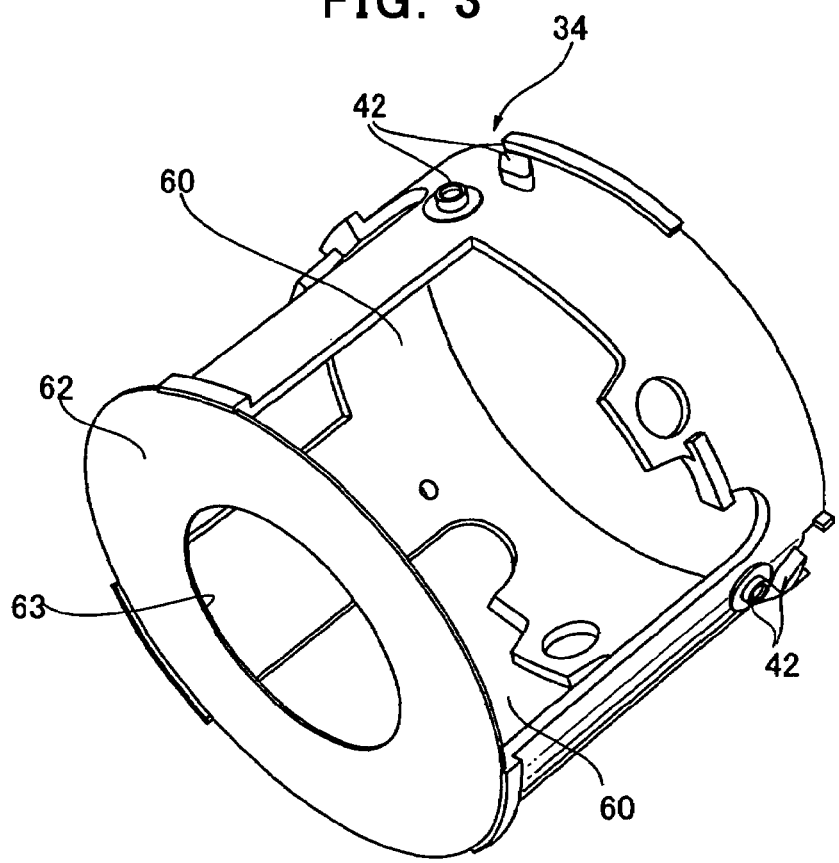
FIG. 3 is a perspective view of a second cam barrel of the first embodiment of the zoom lens system according to the present invention.

The first cam barrel 32 has convex cams 40 protruding from an inner surface thereof. As can be seen in FIG. 3, the second cam barrel 34 has its outer surface provided with cam studs 42 that are engaged with the convex cams 40. The first cam barrel 32 is, as depicted in FIG. 2, provided with cam grooves 44 serving as tracks to guide the third group of lens pieces. A trailing end of the linear cam barrel 36 holds the fourth group of lens pieces 14. The second cam barrel 34 has three large clearances 60, as shown in FIG. 3. The clearances 60 are defined in positions in the second cam barrel 34 so as not to cause an interference of the second cam barrel 34 with coupling members 52 by which a displacement of third cam pins 67 fitted in the cam grooves 44 in the first cam barrel 32 is transmitted to the third group of lens pieces 13, and so as not to cause an interference of the second cam barrel 34 with raised portions 70 formed in the second cam barrel 34 that function to position an end 68 of the linear cam barrel 36 in a plane orthogonal to the optical axis (the end 68 is the one closer to the photographed subject).

A light-shielding plate 62 like an iris diaphragm, namely, a doughnut-shaped plate type fixed aperture stop is placed at an end of the second cam barrel 34 closer to the photographed subject. Without the iris diaphragm light-shielding plate 62, stray light L passing through the clearances 60 in the second cam barrel 34 is reflected from an inner surface of the first cam barrel 32, and the reflected beams pass through areas without the convex cams 40 to return and come through the clearances 60 in the second cam barrel 34. One way of determining a diameter of an aperture 63 of the iris diaphragm light-shielding plate 62 is selecting the maximum diameter with which rays effective to produce an image in the telephoto view field would not be shielded.

Embodiment 2

Figure 4:
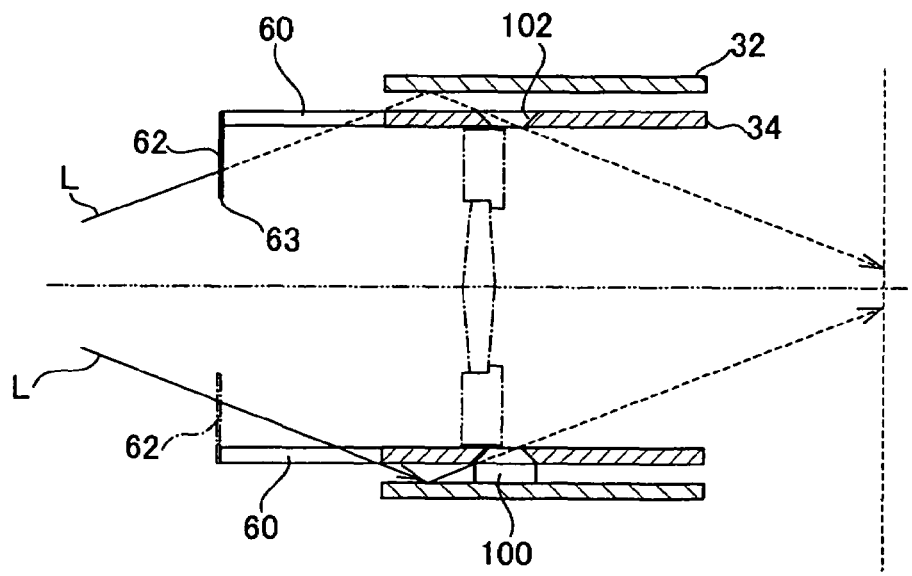
FIG. 4 is a sectional view of the second cam barrel of a second embodiment of the zoom lens system according to the present invention.

In another embodiment of the present invention, like reference numerals denote the same components as those mentioned in the Embodiment 1, and descriptions of those components are omitted hereinafter. As can be seen in FIG. 4, the convex cams 40 formed in the inner surface of the first cam barrel 32 are replaced with cam pins 100, and the second cam barrel 34 has cam grooves 102. Without the iris diaphragm light-shielding plate 62, the stray light L passing through the clearances 60 defined in the second cam barrel 34 is reflected from the inner surface of the first cam barrel 32 to return and come through the cam grooves 102. The iris diaphragm light-shielding plate 62 blocks such stray light L.

What is claimed is:

1. A zoom lens system comprising a first cam barrel rotating about an optical axis of the system and a second cam barrel located inside the first cam barrel in cam-linkage with the same, the second cam barrel including openings to let light beams pass through, a light-shielding plate like an iris diaphragm being supported by the second cam barrel in position closer to photographed subject in the second cam barrel so as to shield the light beams that come in from the openings in the second cam barrel after going out of the openings in the second cam barrel and then being reflected from an inner surface of the first cam barrel.

2. The zoom lens system according to claim 1, wherein the openings in the second cam barrel are clearances defined to avoid an interference of the second cam barrel with a driving member used to move components within the second cam barrel.

3. The zoom lens system according to claim 1, wherein convex cams are provided in an inner surface of the first cam barrel or an outer surface of the second cam barrel, and the light beams that are to be reflected from the inner surface of the first cam barrel pass through portions where the convex cams are terminated.

4. The zoom lens system according to claim 1, wherein part of each of the openings in the second cam barrel is shaped in a cam groove.

* * * * *